Feb. 27, 1945.   W. H. SILVER   2,370,374
DISK TILLER
Filed Aug. 20, 1941   2 Sheets-Sheet 1

INVENTOR
WALTER H. SILVER
BY
ATTORNEYS

Feb. 27, 1945.                W. H. SILVER                2,370,374
                              DISK TILLER
                        Filed Aug. 20, 1941            2 Sheets-Sheet 2
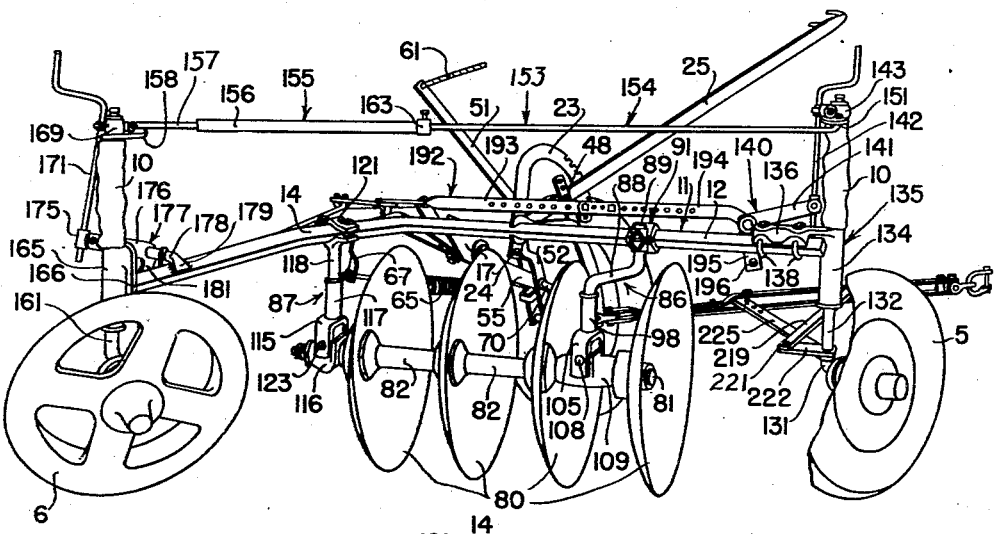
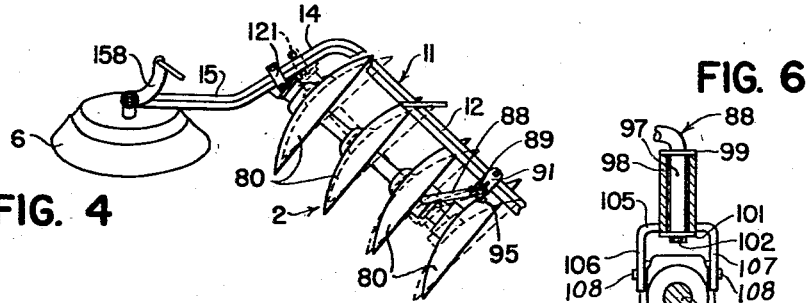
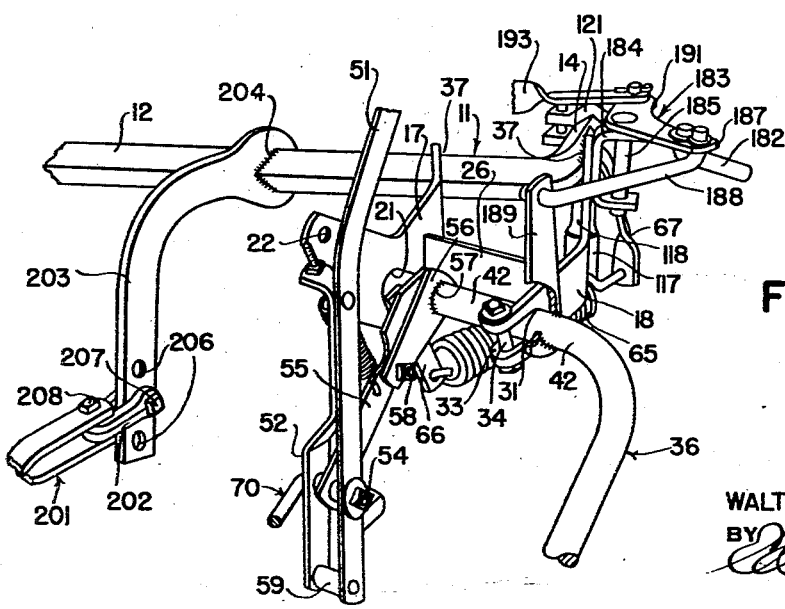
INVENTOR
WALTER H. SILVER
BY
ATTORNEYS Patented Feb. 27, 1945

2,370,374

UNITED STATES PATENT OFFICE 2,370,374

DISK TILLER

Walter H. Silver, Moline, Ill., assignor to Deere & Company, Moline, Ill., a corporation of Illinois Application August 20, 1941, Serial No. 407,549

28 Claims. (Cl. 97—53)

The present invention relates generally to agricultural implements and more particularly to disk tillers, sometimes referred to as disk plows or harrow plows.

The object and general nature of the present invention is the provision of an agricultural implement of this type in which convenient and easily operated means is provided for changing the angle of cut of the gang of disks without affecting the relation between the rearmost disk and the rear furrow wheel which normally runs in the bottom of the furrow opened by the rear disk. Another feature of the present invention is the provision of improved steering connections whereby the implement is more easily controlled, both in the raised and lowered positions. More specifically, it is a feature of this invention to provide means swingably connecting the forward end of the disk gang to the supporting frame and shiftable means supporting the other end of the disk gang on the frame, the parts being so related that the disk gang may be disposed in different positions of angular adjustment, thereby changing the width of cut, while maintaining the landward edge of the rear disk substantially in the same vertical longitudinal plane in all positions of adjustment.

Another feature of this invention is the provision of improved frame means facilitating the attachment of a lifting crank axle to the frame for accommodating the rocking movement of the crank axle relative thereto. Specifically, it is a feature of this invention to provide a pair of brackets, one having an opening therein and the other having an open slot, whereby the crank axle, with certain portions already fixed thereto, may be connected with the frame by inserting an end of the crank axle in said opening and disposing an intermediate portion of the crank axle in the slotted bracket portion, whereby the crank axle is readily mounted for rocking movement relative to the frame notwithstanding that parts were previously connected to the crank axle. In this respect the present invention is an improvement over prior constructions in which the crank axle was required to be inserted through openings in brackets before any of the parts could be attached to the crank axle.

Another important feature of the present invention is the provision of a scraper assembly which is so supported on the disk gang that it remains in operative relation with respect thereto when the disk gang is adjusted relative to the associated frame to change the width of cut or for other reasons. Specifically, it is a feature of this invention to provide a disk gang in which the ends are connected by bearing supports with the frame, in which the bearing supports are particularly constructed to permit the attachment of the scraper assembly thereto, the disk gang being connected by means associated with the bearing supports and adjustably connected with the frame. A further feature of this invention is the provision of means associated with the front and rear furrow wheels whereby, during operation, both may be steered by the implement hitch but in which the parts may be so arranged that, during transport, only the front furrow wheel is steered, the connections serving to hold the rear furrow wheel against steering movement. This serves to stabilize the implement during transport.

These and other objects and advantages of the present invention will be apparent to those skilled in the art after a consideration of the following detailed description, taken in conjunction with the accompanying drawings in which the preferred embodiment of this invention has been illustrated.

In the drawings:

Figure 3 is a perspective three-quarter rear view of the implement shown in Figure 1;

Figure 4 is a fragmentary plan view, on a reduced scale, showing the manner in which the width of cut may be varied while retaining the rear disk in substantially the same lateral position relative to the rear furrow wheel;

Figure 5 is a fragmentary enlarged perspective of a portion of the frame, showing the method of attaching and rockably supporting the crank axle; and Figure 6 is a sectional view of one of the bearing supports for the disk gang, taken substantially along the line 6—6 of Figure 1.

Figures 1, 2:
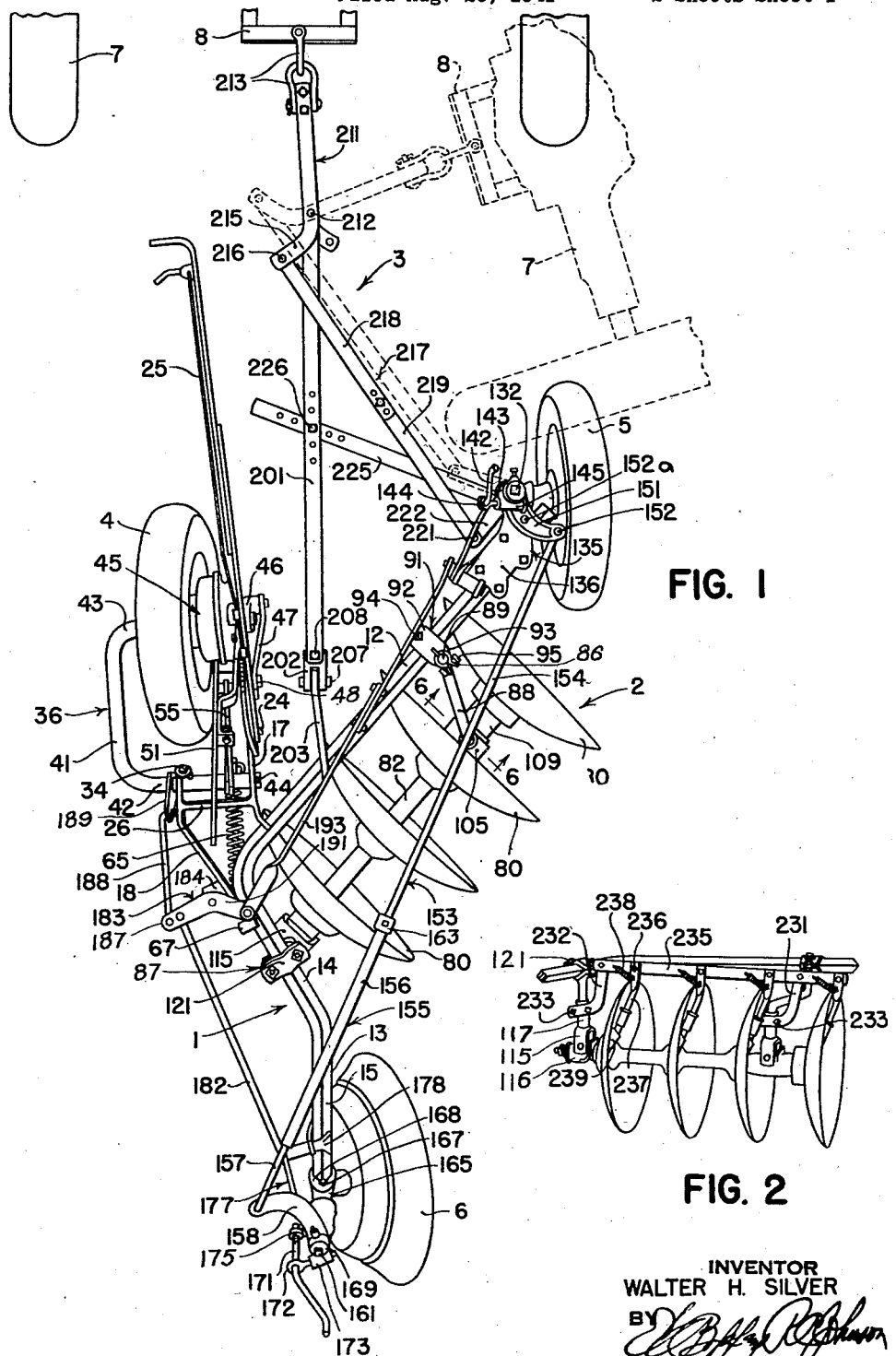
Figure 1 is a top perspective of a disk tiller in which the principles of the present invention have been incorporated.
Figure 2 is a fragmentary perspective view showing the method of supporting the scraper assembly.

Referring now to the drawings, more particularly to Figures 1 and 3, the present invention has been illustrated as incorporated in a disk tiller which, in general, includes a frame structure 1, a gang of disks 2, a hitch device 3 and supporting wheels 4, 5 and 6. The tiller is adapted to be hitched to a tractor or other source of power indicated by the reference numeral 7, the latter having a drawbar 8 to which the forward end of the hitch device 3 is connected.

The frame 1 of the disk tiller comprises a frame bar 11 having a main portion 12 which is disposed generally diagonally and a rear portion 13, the forward part 14 of which extends generally diagonally in the other direction, more or less at a right angle to the section 12, the rear portion of the frame section 13 extending generally directly rearwardly, as indicated at 15. A pair of brackets 17 and 18 are welded or otherwise secured to the frame beam 11 in generally laterally spaced apart relation, the brackets 17 and 18 being formed so that, as best shown in Figure 1, they extend laterally outwardly and forwardly with respect to the beam 11, being secured to the latter substantially at the junction between the two diagonal sections 12 and 14. The laterally inner bracket 17 preferably is in the form of a plate member having an aperture 21 and openings 22 to which a sector 23 is bolted, as at 24 (Figure 3). A master depth controlling lever 25 is pivoted on the upper bolt 24 and carries the usual detent mechanism cooperating with the sector 23. A brace 26 (Figure 5) is welded to the two brackets 17 and 18 to give them lateral rigidity. In axial alignment with the opening 21 in the laterally inner bracket 17, the laterally outer bracket 18 is formed with a slot 31 which is open at one end, the forward portions of the bracket on opposite sides of the slot being turned backwardly, as at 33, to form generally vertically aligned openings in which a bolt 34 is disposed. The bolt 34 is removable to provide for insertion and removal of a crank axle indicated in its entirety by the reference numeral 36, as will be explained below. The welds by which the brackets 17 and 18 are preferably secured to the bar 11 are indicated at 37 in Figure 5.

The crank axle 36 comprises a generally U-shaped member 41 having an end portion 42 disposed for rocking movement in the opening 21 and the slot 31 in brackets 17 and 18, and is held in place by a pin 44. The other end portion 43 of the crank axle 36 is provided with suitable journal means receiving the land wheel 4 of the tiller. The latter wheel is connected to drive a power lift clutch mechanism, indicated in its entirety by the reference numeral 45. The particular details of the clutch 45 do not per se form any part of the present invention, being disclosed and claimed in my co-pending application, Serial No. 391,918, filed May 5, 1941, now U. S. Letters Patent No. 2,346,514, dated April 11, 1944, to which reference may be had if necessary. The implement parts shown in said patent are portions of the present implement. The clutch mechanism 45 includes a driven crank member 46 that is connected by a link 47 with the master depth adjusting lever 25, as by a pivot bolt 48 (Figure 3). As will be understood by those familiar with agricultural implement power lift clutches, successive half revolutions of the crank 46 resulting from the rotation of the land wheel 4 causes the crank axle 36 to rock upwardly and downwardly in its rocking support in the brackets 17 and 18. The clutch 45 is controlled by a trip lever 51 which, according to the present invention, is provided with a hammer strap 52 at the lower end of the trip lever, the lower portion of the latter and the hammer strap being apertured to receive a pivot bolt 54 carried at the lower end of a downwardly and forwardly extending arm 55, the upper end of which is apertured to receive the section 42 of the crank axle 36. The latter is provided with an arm 56 welded thereto, as at 57, and the arm 56 is apertured to receive a bolt 58 by which the arm 55 is rigidly connected to form a part of the crank axle 36. At its lower end, the trip lever 51 carries a roller 59 which controls the operation of the power lift clutch 45. A cable 61 extends forwardly from the upper end of the trip lever 51 to the operator's station on the tractor 7. A counterbalancing spring 65 is connected at its forward end to a bracket 66 that is fixed, as by rivets or the like, to the arm 55, and at its rear end the counterbalancing spring 65 is adjustably connected with a depending bracket 67, the upper end of which is welded or otherwise secured to the rearwardly extending section 14 of the frame beam 11. The pivot bolt 54 (Figure 5) is in the form of a brace having a bolt section at its upper end and an eye portion (not shown) at its lower end disposed about the laterally inner end of the crank axle section 43. The brace member is indicated in its entirety in Figure 5 by the reference numeral 70.

The disk gang 2 includes a plurality of soil working disks 80 of conventional construction, the disks being mounted on a gang shaft 81 whereby the disks are supported for simultaneous rotation. Suitable spacing spools 82 are disposed on the gang shaft between the disks. The disk gang 2 is connected with the frame 1 by front and rear supports indicated in Figure 3 by the reference numerals 86 and 87, respectively. The front disk gang support 86 comprises a swinging crank or link member 88 having at its forward end an upturned portion 89 which is secured by a clamp casting 91 to the forward portion of the diagonal frame section 12. The clamping member 91 includes two parts, one part indicated by the reference numeral 92 embracing the diagonal beam section 12 while the other part 93 embraces the upturned end 89 of the swingable link or crank member 88. Each of the sections 92 and 93 is split and is provided with a clamping bolt by which the parts may be securely fixed to the frame beam or the member 88. Referring to Figure 1, the clamping bolt for the clamping section 92 is indicated by the reference numeral 94 and the clamping bolt for the other section 93 is indicated by the reference numeral 95.

The member 88 includes a downturned spindle portion 97 that is disposed for rocking movement in an upwardly extending sleeve 98. A collar 99 at the upper end of the sleeve on the section 97 limits the downward movement of the member 88 relative to the disk gang 2, and a washer 101 and a cotter 102 limits the upward movement of the section 97 relative to the sleeve 98, as best shown in Figure 6. The sleeve 98 is welded to a yoke 105, the arms 106 and 107 of which are apertured to receive a pivot 108 by which a gang shaft bearing 109 is connected to the support 85. The gang shaft 81 is journaled for rotation in the bearing 109, and the pivot member 108 is disposed transversely of the axis of the gang shaft 81 and perpendicular to the axis of the spindle section 97 of the swinging support member 88.

The other support member 87, for the rear end of the disk gang 2, is of similar construction, including a yoke member 115 pivoted to the rear gang shaft bearing 116 and having a vertically disposed sleeve section 117 in which the lower end of a bracket or support member 118 is disposed. The member 118 is formed similar to the section 97 and is limited against axial displacement in the sleeve 117 by substantially the same means shown in Figure 6. The upper end of the member 118 carries clamping means 121 by which the standard or support 87 may be secured to the rearwardly extending section 14 of the frame beam 11 in different positions of adjustment therealong. Likewise, the clamping member 91 may be fixed to the forward end of the frame section 12 in different positions of adjustment as desired. The transverse pivot connection between the yoke 115 and the bearing 116 is indicated by the reference numeral 123 in Figure 3, the axis defined by the member 123 being normal to the axis of the sleeve 117.

The front furrow wheel 5 (Figure 3) is journaled for rotation on the lower outturned stub shaft section 131 of a vertical spindle 132. The latter is received for vertical sliding movement in a sleeve 134 forming a part of a casting 135 having a clamping section 136 that is adapted to be secured to the forward end of the draft beam 11 by any suitable means, such as a pair of U-bolts 138. A bell crank 140 has one arm 141 connected to the lower end of a crank screw 142, the upper end of which is anchored in a cap member 143 by any suitable means, such as an eye bolt 144 (Figure 1) rockably received in a sleeve section 145 of the cap 143. Rocking of the bell crank 140, as will be referred to later, reacts through the adjusting crank screw 142 against the upper end of the spindle 132 for the purpose of raising and lowering the front end of the frame relative to the front furrow wheel 5. In Figure 3, the parts are shown in their raised or transport position. A canvas boot 10 encloses the spindle 132 between the sleeve 134 and the cap member 143 to protect the portion of the spindle that slides through the sleeve and to retain lubrication thereon.

An arm 151 is fixed in any suitable manner to the upper end of the front furrow wheel spindle 132 and is apertured at its outer end to receive the upturned end 152 of a generally longitudinally extending link 153. The latter member is made up of a pair of telescopically associated rod sections 154 and 155, the latter including a sleeve section 156, the rear end of which is secured to a rod 157 having a downturned end disposed in an aperture in the outer end of an arm 158 secured to the upper end of a spindle 161 on the lower end of which the rear furrow wheel 6 is journaled. A set screw collar 163 at the forward end of the sleeve section 156 serves to retain the link members 154 and 155 in adjusted position. It will be noted from Figure 1, that the arms 151 and 158 extend generally in opposite directions, whereby if, for example, the front furrow wheel 5 should be turned in a clockwise direction, the rear furrow wheel 6 would be turned in a counterclockwise direction.

The axle construction for the rear furrow wheel 6 is substantially the same as that for the front furrow wheel 5. A sleeve member 165 receives the vertical portion of the spindle 161 and is provided with a pad 166 which is bolted, as at 167, to a corresponding pad 168 secured, as by welding, to the rear end of the longitudinal frame bar section 15. As best shown in Figure 3, the spindle section 161 extends upwardly through the sleeve section 165 and carries a cap 169 at the upper end to which a crank screw 171 is anchored, as by an eye bolt 172 received in a sleeve section 173 on the cap 169. This spindle is also protected by a canvas boot 10 from dirt and moisture. The lower threaded end of the crank screw 171 is screwed into a nut member 175 which is pivoted to one arm 176 of a bell crank 177. The latter is mounted for rocking movement on a bracket 178 that is welded, as at 179, to the rear end of the frame bar section 11.

The other arm of the bell crank 177 is bent generally downwardly, as at 181 (Figure 3), and is connected by a rod 182 (Figure 1) to one arm 187 of a horizontally disposed bell crank 183 journaled for rocking movement on a bracket 184 by a pivot member 185 (Figure 5). The bracket 184 is secured to the frame bar 11 in any suitable manner, preferably by welding, to the side of the laterally outer crank axle bracket 18. The arm 187 of the bell crank 183 is connected by a link 188 to an arm 189 fixed, as by welding, to the laterally outer part of the crank axle section 42, as best shown in Figure 5. The other arm 191 of the bell crank lever 183 is connected by a link member 192 to the downwardly extending arm of the bell crank 140 associated with the front furrow wheel 5. Preferably, the link member 192 consists of two strap sections 193 and 194, the latter having a downturned end 195 pivoted, as at 196, to a pin carried on the downturned arm of the bell crank 140. The link sections 193 and 194 may be connected together in different positions of adjustment to vary the effective length thereof. As will be clear from the above description, whenever the power lift clutch 45 is operated to cause the crank axle 36 to rock in a generally vertical direction, the upper end of the arm 189 (Figure 5) shifts in a generally longitudinal direction, causing the bell crank 183 to rock, and rocking movement of the latter member is transmitted through the link members 182 and 192 to the front and rear furrow wheel bell cranks 140 and 177, thereby raising and lowering the tiller frame substantially the same amount with respect to all three of its supporting wheels.

As mentioned above, the front and rear furrow wheels are mounted for swinging movement about vertical axes, as defined by their vertical spindle sections 132 and 161, one wheel being turned in one direction while the other wheel is turned in the other direction. This action is made use of to secure a steering control which permits the tractor and tiller to be turned in a much shorter radius than is ordinarily possible with tillers and like implements.

Referring now more particularly to Figure 1, the hitch construction 3 includes a main draft transmitting member 201 connected by a clevis 202 to the lower end of a draft bracket 203, the upper end of which is welded, as at 204, to the intermediate portion of the draft beam 11. The lower end of the draft bracket 203 is provided with a plurality of openings 206 to receive a bolt 207 by which the clevis 202 may be connected to the member 203 in different vertical positions. The clevis 202 is connected to the rear end of the draft transmitting member 201 by a vertical pivot bolt 208, as best shown in Figure 5. A laterally swingable hitch member 211 is connected by a pivot member 212 to the forward end of the main draft transmitting member 201. The forward end of the hitch member 211 is connected by any suitable means, such as clevis members 213, to the draft bar 8 of the tractor 7, and the rear end of the hitch member 211, rearwardly of the pivot 212, is provided with a laterally and rearwardly extending arm 215 which is apertured to receive a pivot member 216, to which is connected the forward end of a steering link 217, which preferably consists of two adjustably connected sections 218 and 219, whereby the effective length of the steering link 217 may be adjusted. The rear end of the steering link section 219 is pivoted, as at 221, to a steering arm 222 preferably welded to the lower end of the front furrow wheel spindle 132 just above the juncture with the laterally directed stub axle section 131, on which the wheel 5 is journaled. A diagonal brace bar 225 is connected by a pin 226 with the main draft transmitting member 201, and at the other end the bar 225 is apertured and is disposed above the lower end of the steering wheel spindle 132, below the steering arm 222, preferably between the stub axle section 131 and the steering arm, as best shown in Figure 3. Thus, the diagonal brace bar 225 extends substantially directly between the main draft transmitting member 201 and the wheel 5, whether the frame of the tiller be raised or lowered. In the lowered position, the lower end of the frame sleeve 134 is closely adjacent the steering arm 222 and the diagonal brace bar 225. Hence, the link 225 is effective to cooperate with the main draft transmitting member 201 when the disks are lowered into operating position.

The provision of the vertically extending sleeves 98 and 117 provides a novel arrangement of the scraper assembly, best shown in Figure 2. Referring now to this figure, a pair of brackets 231 and 232, preferably identical, have lower laterally deflected portions that are clamped, as by U-bolts 233, to the bearing support sleeves 98 and 117, respectively. A scraper support bar 235 is bolted to the upper ends of the scraper brackets 231 and 232 and is apertured to receive bolts 236 by which a plurality of scraper arms 237 are pivotally connected to the bar 235. A spring 238 is connected between each scraper arm and the bar 235 for urging the scraper 239, which is fixed to the lower end of each arm 237, against the associated disk 80. By loosening the U-bolts 233, the brackets 231 and 232 may be lowered or raised as required. Since the scraper assembly is secured directly to the bearing support sleeves 98 and 117, it will be seen that when the disk gang 2 is adjusted relative to the frame bar 11, the scrapers are adjusted with the disks and that it is not necessary to readjust the scrapers whenever the disks are adjusted. For example, referring to Figure 4, by loosening the clamp 121 and the clamping bolt 95, the rear end of the disk gang may be moved along the diagonal bar section 14, the support member 88 swinging about the vertical axis of the clamping section 93. The angle of the section 14 relative to the section 12 and the arrangement of the swinging member 88 are such that in any position of adjustment of the disk gang, the rear disk is always substantially in the same lateral position relative to the rear furrow wheel 6, or, in other words, the laterally inner edge of the rear disk moves generally in a straight line longitudinally of the implement when adjusting the disk gang. Thus, the relation of the rear furrow wheel and the rearmost disk behind which the rear furrow wheel runs is not varied when the disk gang 2 is adjusted for different angular positions, such adjustment usually being made to vary the width of cut. In Figure 4, the narrow width of cut is indicated by the position of the disk gang 2 in full lines, while the wide setting is indicated in dotted lines. In both positions it will be seen that the laterally inner edge of the rear disk is disposed in a vertical longitudinal plane in both positions, and in all intermediate positions. The clamping member 91 is also adjustable along the diagonal section 12 of the frame beam.

The operation of the implement described above is substantially as follows:

Figure 1 shows the parts in operating position, the front furrow wheel 5 running in the furrow opened by the rearmost disk 80 on the previous round. The front and rear adjusting crank screws 142 and 171 may be turned to level the tiller in operation, the rear crank screw 171 being adjusted so that the rear furrow wheel 6 is approximately level with the bottom edge of the disks. The plurality of holes in the left end of the diagonal brace bar 225 permits the pin 226 to be disposed in various positions so as to accommodate various widths of tractors. The pin 226 is placed in the proper hole so that the front disk of the tiller will turn a complete slice adjacent the previously formed furrow. For normal operation, the clamp 121 of the rear standard or bearing support 87 is shifted along the frame bar so that the disk gang is approximately parallel with the frame bar section 12. To reduce the width, the rear bearing standard is moved rearwardly, which adjusts the disk tiller for hard ground, while the width of cut may be increased, as for operating in soft ground, by moving the rear bearing support forwardly. The disk tiller of the present invention is particularly adapted for use in close quarters due, first, to the fact that turning of the tractor in one direction or the other swings the hitch member 211, which causes the front and rear furrow wheels to turn in opposite directions, and second, by virtue of the fact that the steering arm 215 of the member 211 and the steering arm 222 of front furrow wheel spindle 132 are directed generally laterally and rearwardly, which disposes the steering link 217 in a position well out of the way of the rear wheels of the tractor, even though a sharp turn to the right is made. Referring to Figure 1, it will be seen that if the tractor is turned to the right, the front furrow wheel 5 will be turned to the right, but that the rear furrow wheel 6 will be turned to the left, with the result that the rear end of the tiller is turned much more rapidly than would be the case if only one of the wheels, such as the front furrow wheel 5, should be steered by the turning of the tractor. This rapid steering action of the implement is not necessary, and may not be desirable, when transporting the implement. To the end of providing an implement that may be made quite stable for movement at relatively high speed in transport position, I provide a second opening 152a (Figure 1) in the front furrow wheel arm 151 closely adjacent the axis of the spindle 132 so as to secure as little movement as possible. When arranging the machine for transport, the front end 152 of the steering link 153 is removed from the outer end of the arm 151 and inserted in the opening 152a. This opening is placed so that steering movement of the front furrow wheel 5 will now affect the rear furrow wheel 6 very little if any. Thus, when arranged for transport, the tractor turns the front furrow wheel 5 but does not turn the rear wheel to any appreciable extent. The effective length of the steering link 217 may be adjusted by shifting the positions of the members 218 and 219 for the purpose of landing the front furrow wheels. The position of the tractor 7 in dotted lines in Figure 1 shows the clearance between the steering link 217 and the right rear tractor wheel of the tractor when making a sharp turn.

The particular frame bracket and crank axle construction permits a very simple procedure in assembling the crank axle on the frame. In the assembly of the crank axle 36, the arm 56 is first welded to the section 42 of the crank axle, and then the arm 55 is bolted thereto, as at 58. The arm 189 is then welded to the axle. The right end of the crank axle section 42 is then inserted in the opening 21 and the intermediate portion of the section 42 then passed into the open slot 31, the bolt 34 being out of the looped sections 33 at this point. After the crank axle, with both arms 56 and 189 attached thereto, is connected with the brackets, the bolt 34 is passed through the looped portions and the nuts tightened thereon, thus severing the crank axle 36 in place. The arm 189 is disposed laterally outwardly of the bracket 18, and hence prevents displacement of the crank axle 36 inwardly relative to the supporting brackets 17 and 18. At the other end, a cotter 44 (Figure 1) is passed through an opening in the right end of the crank axle section 42, and thus prevents laterally outward displacement of the crank axle 36.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A disk tiller comprising a frame including a generally diagonal section and a generally rearwardly extending section and bracket means extending laterally outwardly and forwardly from the juncture of said sections, a disk gang having its forward end pivotally connected with the forward portion of said diagonal frame section and its rear end slidably connected with the rearwardly extending portion of said section of said frame, the rear disk of said gang being disposed substantially directly forwardly of the rearwardly extending section of said frame, and a land wheel connected with said laterally outwardly and forwardly disposed brackets and adapted to run on the land to the landward side of the rear disk.

2. An agricultural implement comprising a frame including a generally diagonal beam, a gang of disks disposed generally diagonally, and means adjustably securing said gang to said beam in different angular positions relative to the line of travel, said means being arranged so that in any position of adjustment the forward edge of the rear disk lies in a straight line parallel to the line of travel.

3. An agricultural implement comprising a frame including a beam having a diagonal portion and a second portion at an angle to the diagonal portion, a disk gang disposed generally parallel to said diagonal portion and including disks and a shaft on which the disks are mounted, bearing supports for the ends of said shaft, means pivotally connecting the bearing support for one end of said shaft with the diagonal portion of said beam, and means shiftable along said second portion of the beam for adjustably fixing the bearing support for the other end of the gang shaft thereto to provide for fixing said disk gang in different angular positions to vary the width of cut.

4. An agricultural implement comprising a generally diagonal frame, a rear furrow wheel at the rear end of said frame, a gang of disks disposed generally diagonally forward of said rear furrow wheel, swingable means connecting the forward part of said gang with the forward part of said frame, and means connecting the rear end of said gang with the portion of said frame forward of said furrow wheel, said last mentioned connecting means being adjustable along said portion of the frame in a direction substantially fore and aft of said furrow wheel to change the angle of said disk gang relative to the line of travel but without varying the lateral position of the rear disk relative to said rear furrow wheel, said swingable means accommodating the corresponding lateral movement of the front end of said disk gang.

5. An agricultural implement comprising frame means, a disk gang, a pair of bearings for rotatably supporting said gang, a pair of yokes pivotally connected, respectively, with said bearings for movement relative thereto about transverse axes, and supporting means connecting said yokes with said frame means including a pair of standards on which said yokes are respectively mounted.

6. In a disk tiller or the like, a bearing support comprising a yoke having apertured ends defining a transverse axis about which said bearing may rock relative to the yoke, a sleeve fixed to said yoke with its axis perpendicular to said first mentioned axis, a crank member having one end rotatably received in said sleeve, and attaching clamp means rotatably receiving the other end of said crank member.

7. An agricultural implement comprising a frame member including two sections disposed approximately at right angles, a disk gang disposed along one section, means connecting one end of said gang with the outer end of said one section and including a crank member swingably connected with said disk gang and said one section, and means connecting the other end of said gang with the other frame section and including a member adapted to be connected with said other section at various points therealong.

8. An agricultural implement comprising frame means having a pair of laterally spaced brackets, one of said brackets having an aperture therein and the other bracket having a slot therein open at one end, a crank axle adapted to be rockably connected with said brackets for mounting a pair of arms fixed thereto in spaced apart relation, the end of said crank axle being insertable through the opening in said one bracket and the portion of the crank axle between the arms carried by the latter being insertable into said slotted portion of the other bracket, means for holding the crank axle in said slotted portion with one of said crank axle arms disposed to one side of said other bracket, whereby said other arm cooperates with said other bracket to prevent axial displacement of said crank axle in one direction, and means on the end of said crank axle laterally outwardly of said one bracket and cooperating with the latter to prevent displacement of said crank axle in the other direction.

9. An agricultural implement comprising frame means, a gang of disks, means adjustably connecting said gang with said frame, including a pair of vertically extending bearing supports connected with the ends of said gang and means movably connecting the upper ends of said bearing supports with said frame means, and a scraper assembly connected with the upper ends of said bearing supports, whereby said scraper assembly moves with said gang when the latter is adjusted relative to said frame.

10. A disk tiller comprising frame means including a frame bar having a generally diagonal portion at its front end and a generally rearwardly extending rear portion and a generally forwardly and laterally outwardly extending bracket connected to said frame bar adjacent the juncture between said sections, a crank axle mounted for rocking movement in the forward portion of said bracket, a land wheel rotatably mounted on said crank axle, and a disk gang pivotally connected at its forward portion with the forward portion of said diagonal bar and slidably connected at its rear end with the rearwardly extending portion of said frame bar, the rear disk being disposed generally forwardly of said rearwardly extending portion of the frame bar and toward the furrowward side of said land wheel.

11. A disk tiller comprising a frame including a generally diagonal section and a generally rearwardly extending section, a disk gang, adjustable means movably connecting one end of said disk gang to said diagonal section, and adjustable means movably connecting the other end of said disk gang to said rearwardly extending section.

12. An agricultural implement comprising a frame including a beam having a diagonal portion and a second portion at an angle to the diagonal portion, a disk gang disposed generally parallel to said diagonal portion and including disks and a shaft on which the disks are mounted, bearing supports for the ends of said shaft, means shiftable along the diagonal portion of said beam connecting the bearing support for one end of said shaft therewith, and means shiftable along said second portion of the beam for adjustably fixing the bearing support for the other end of the gang shaft thereto to provide for fixing said disk gang in different angular positions to vary the width of cut.

13. An agricultural implement comprising a supporting frame, a disk gang, a pair of bearing supports at opposite ends of said disk gang, respectively, and means for mounting said bearing supports on said frame including means for shifting one of said supports relative to said frame along a substantially straight line and means for shifting the other of said supports relative to said frame along an arc.

14. An agricultural implement comprising a supporting frame, a disk gang, a pair of bearing supports at opposite ends of said disk gang, respectively, and means for mounting one of said bearing supports on said frame including means for shifting said one support relative to said frame along a substantially straight line and providing for swinging movement of said support about a generally vertical axis, and means for supporting the other of said supports on said frame providing for shifting movement thereof with said gang incidental to said shifting of said one support.

15. An agricultural implement comprising a frame, supporting wheels rotatably mounted thereon, a disk gang, a pair of shaft bearings therefor, a supporting standard for each of said bearings and connected thereto by means providing for relative swiveling movement about vertical axes, and shiftable mounting means for each of said standards providing for shifting movement of the latter relative to said frame in relatively different directions to adjust said gang angularly relative to said frame and to the line of advance.

16. A disk tiller comprising a frame including a diagonally extending section and a generally fore and aft extending section, a supporting wheel mounted on said frame adjacent the forward end of said diagonal frame section, a second supporting wheel mounted adjacent the rear end of said fore and aft extending section, and a third supporting wheel mounted at an intermediate point on said frame, a diagonally disposed disk gang, a pair of shaft bearings therefor, means for supporting one of said bearings on said fore and aft extending frame section providing for fore and aft shifting movemnet of said bearing relative thereto, and means for supporting the other of said bearings on said diagonally extending frame section providing for shifting said other bearing generally transversely relative to the line of advance of said implement.

17. A disk tiller comprising a frame including a diagonally extending section and a generally fore and aft extending section, a supporting wheel mounted on said frame adjacent the forward end of said diagonal frame section, a second supporting wheel mounted adjacent the rear end of said fore and aft extending section, and a third supporting wheel mounted at an intermediate point on said frame, a diagonally disposed disk gang, a pair of shaft bearings therefor, a supporting standard for each of said bearings and connected thereto by means providing for relative swiveling movement about vertical axes, and shiftable mounting means for each of said standards providing for shifting movement of one of said bearings along said generally fore and aft extending frame section and providing for swinging movement of said gang about the vertical axis of swiveling movement of said one bearing, and providing for shifting movement of the other bearing with said gang relative to said diagonally extending section.

18. An agricultural implement comprising a supporting frame, a disk gang, a pair of bearing supports at opposite ends of said disk gang, respectively, and means for mounting said gang on said frame at an acute angle relative to the direction of travel and for adjusting said angle, comprising means for mounting the rear bearing support on said frame providing for shifting said support thereon along a line angled in the opposite direction to the direction of travel, said gang and bearing support being swingable about a vertical axis adjacent the latter to swing the forward edge of the rearmost disk into a position directly in fore and aft alignment with other positions of said edge in other shifted positions of said bearing support, and shiftable means for mounting the forward bearing support on said frame providing for said shifting and swinging movements of said gang.

19. An agricultural implement comprising a frame, wheel means for supporting said frame including a rear furrow wheel, a disk gang disposed at an acute angle to the direction of travel, front and rear bearing supports therefor, means for mounting said rear bearing support on said frame to position the rearmost disk directly ahead of said rear furrow wheel to form the furrow in which the latter rolls, said mounting means providing for shifting movement of said rear bearing support along a straight line angled in the opposite direction to the direction of travel and for swinging said bearing support about a generally vertical axis, and means for adjustably mounting said front bearing support on said frame providing for said shifting and swinging movements of the rear bearing support and gang and adapted to produce a horizontal angular movement of said gang incident to a linear shifting movement of said rear bearing support to maintain the front edge of the rearmost disk in a constant fore and aft alignment with said rear furrow wheel.

20. An agricultural implement comprising frame means, a disk gang, a pair of bearings for rotatably supporting said gang, a pair of yokes pivotally connected, respectively, with said bearings for movement relative thereto about transverse axes, a pair of sleeves fixed to said yokes, respectively, with their axes substantially perpendicular to said transverse axes, and supporting means connecting said yokes with said frame means including a pair of standards on which said sleeves are rotatably received, and means for shiftably attaching said standards to said frame means to adjust said gang angularly relative thereto.

21. An agricultural implement comprising a frame, a gang of disks, means adjustably connecting said gang with said frame including a pair of bearings connected with the ends of said gang, standards extending upwardly from said bearings, and means movably connecting the upper ends of said standards with said frame, a scraper assembly, and means supporting opposite ends of said scraper assembly on said standards, respectively, said supporting means being adjustable vertically relative to said standards and movable therewith when the latter are adjusted relative to said frame.

22. An agricultural implement comprising a wheel supported frame, a gang of disks, means adjustably connecting said gang with said frame including a pair of bearings connected with the ends of said gang, standards extending upwardly from said bearings, and means movably connecting the upper ends of said standards with said frame, a scraper assembly including a support bar and means supporting opposite ends of said support bar on said standards, respectively, said supporting means comprising clamps embracing said standards and shiftable vertically thereon and bolt means for securing said clamps to said standards in vertically adjusted position, whereby said scraper assembly moves with said gang when the latter is adjusted relative to said frame.

23. An agricultural implement comprising a frame including angularly related sections disposed in a generally horizontal plane, a ground working tool unit, a crank arm swingably connecting one end of said unit with one of the sections of said frame and supporting that end of the tool unit on the frame against relative movement in a generally vertical direction, and means slidably connecting the other end of said unit with the other section of said frame.

24. An agricultural implement comprising frame means including a pair of spaced apart brackets, one of said brackets being apertured and the other having a slot formed therein, a crank axle removably associated with said brackets and having one end adapted to be inserted in the opening in said one bracket, a portion of said crank axle being adapted to be laid into the slot in the other bracket, an arm permanently mounted on said portion of said axle between said brackets, and means for holding said crank axle in said slot.

25. An agricultural implement comprising frame means including a pair of spaced apart brackets, one of said brackets being apertured and the other having a slot formed therein, a crank axle shiftable axially relative to and removably associated with said brackets and having one end adapted to be inserted in the opening in said one bracket, a portion of said crank axle being adapted to be laid into the slot in the other bracket, an arm permanently mounted on said portion of said axle between said brackets, and bolt means adapted to bridge the end of said slot for removably holding said crank axle in said slot.

26. An agricultural implement comprising frame means, a working unit, a pair of bearings for rotatably supporting said unit, a pair of yokes pivotally connected, respectively, with said bearings for movement relative thereto about transverse axes, a pair of sleeves fixed to said yokes, respectively, with their axes substantially perpendicular to said transverse axes, and supporting means connecting said yokes with said frame means including a pair of standards on which said sleeves are rotatably received, and means for shiftably attaching said standards to said frame means to adjust said unit angularly relative thereto.

27. An agricultural implement comprising frame means, a working unit, a pair of bearings for rotatably supporting said unit, a pair of yokes pivotally connected, respectively, with said bearings for movement relative thereto about transverse axes, a pair of sleeves fixed to said yokes, respectively, with their axes substantially perpendicular to said transverse axes, and supporting means connecting said yokes with said frame means including a pair of generally downwardly extending standards on which said sleeves are received.

28. An agricultural implement comprising frame means, a working unit, a pair of bearings for rotatably supporting said unit, a pair of yokes pivotally connected, respectively, with said bearings for movement relative thereto about transverse axes, supporting means connecting said yokes with said frame means, each supporting means including a generally vertically disposed standard and a generally vertically disposed sleeve rockably receiving said standard, one of each associated standard and sleeve being fixed to the associated yoke, and means for shiftably connecting the other of each associated standard and sleeve to said frame means to adjust said unit angularly relative thereto.

WALTER H. SILVER.